United States Patent [19]
LaGrouw

[11] 3,821,004
[45] June 28, 1974

[54] NiO AND CoO CONTAINING GLASS FOR TELEVISION DISPLAY CATHODE-RAY TUBES

[75] Inventor: Coenraad Maria LaGrouw, Eindhoven, Netherlands

[73] Assignee: U.S. Philips Corporation, New York, N.Y.

[22] Filed: Nov. 10, 1971

[21] Appl. No.: 197,511

Related U.S. Application Data

[63] Continuation of Ser. No. 837,794, June 30, 1969, abandoned.

[30] Foreign Application Priority Data

July 3, 1968 Netherlands...................... 6809435

[52] U.S. Cl. ................................ 106/52, 106/47 R
[51] Int. Cl. ......................... C03c 3/04, C03c 3/24
[58] Field of Search...................... 106/52, 54, 47 R

[56] References Cited
UNITED STATES PATENTS

| | | | |
|---|---|---|---|
| 2,901,366 | 8/1959 | Smith et al............................ | 106/52 |
| 2,938,808 | 5/1960 | Duncan et al. ....................... | 106/52 |
| 2,991,185 | 7/1961 | Smith et al............................ | 106/52 |
| 3,024,120 | 3/1962 | Babcock .............................. | 106/52 |
| 3,143,683 | 8/1964 | Duncan et al. ....................... | 106/52 |
| 3,222,206 | 12/1965 | Cornelissen et al. ................. | 106/52 |
| 3,373,302 | 3/1968 | Barber.................................. | 106/52 |
| 3,416,937 | 12/1968 | Enomoto ............................. | 106/54 |

FOREIGN PATENTS OR APPLICATIONS 1,123,857 8/1968 Great Britain....................... 106/52

OTHER PUBLICATIONS

Ceramic Industry Magazine, "Glass Sands," (Sibia), January 1967, pg. 138–139.

Primary Examiner—A. B. Curtis
Assistant Examiner—Mark Bell
Attorney, Agent, or Firm—Frank R. Trifari

[57] ABSTRACT

A glass suitable for the window of a cathode-ray television display tube having a relatively increased transmission for red light (at approximately 618 mn) and a relatively decreased transmission for blue light (at approximately 455 nm). The glass, which is otherwise standard, includes NiO and CoO in a weight ration between 10 and 30 and satisfies the condition that $$0.4 < 97 C_{CoO} + 21 C_{NiO} < 0.5$$

$C_{CoO}$ and $C_{NiO}$ representing the CoO and NiO contents respectively.

2 Claims, 1 Drawing Figure

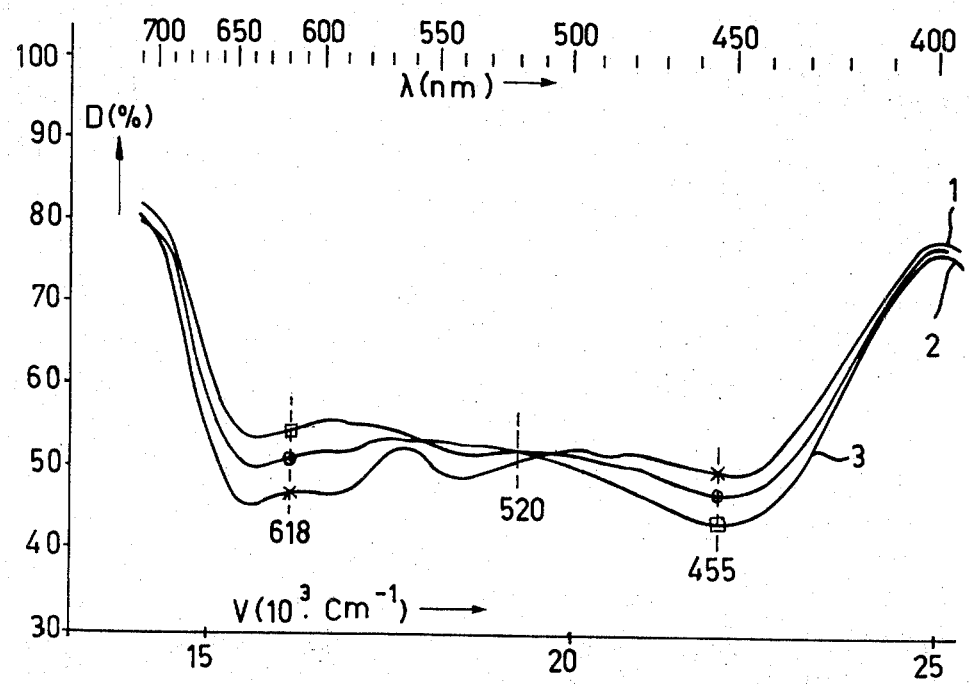

NIO AND COO CONTAINING GLASS FOR TELEVISION DISPLAY CATHODE-RAY TUBES

This is a continuation of application Ser. No. 837,794, filed June 30, 1969 now abandoned.

The invention relates to glass for an envelope of a cathode ray tube for television display, particularly glass for the window of cathode ray tubes for displaying coloured television images.

It is known to add a small quantity of two or more coloured oxides to the screen glass for television display of both monochrome and coloured images. These coloured oxides give the glass a substantially neutral grey colour. Its purpose is to mitigate the impeditive influence of light sources outside the television set caused by reflection of light from these sources against the luminescent layer and becoming noticeable by a reduction of the picture contrast. The action of these coloured oxides is based on the recognition of the fact that the light reflected by the luminescent layer passes the glass of the window twice and the light emitted by the luminescent layer passes the glass only once so that the first-mentioned light is more attenuated than the last-mentioned light.

The ratios between the quantities of nickel oxide and cobalt oxide, which are mostly used for this purpose, are chosen to be such that a given overall transmission is obtained for the visible light. In practice, the weight ratio used between nickel oxide and cobalt oxide, lies at values between 2 and 9.

In the currently used luminescent substances the red luminescent substances have a smaller light output than the blue luminescent substances.

It is therefore necessary to ensure that the areas where the red luminescent phosphor is present on the screen are impinged upon by electrons at a much greater energy than those where the blue luminescent phosphor is present. In practice this means that the electron gun, which supplies the electrons destined for the red phosphors, must be operated at a voltage which is almost twice as high as that of the gun which supplies the electrons destined for the blue phosphors. This reduces the lifetime of the cathode ray tube rather considerably. The green luminescent phosphors have a light output which is approximately the average of the red and the blue luminescent phosphors. In this respect these do not therefore present any problem. The maximum values of the emission of the usual red, green and blue luminescent substances lie approximately at 618, 520 and 455 nm., respectively.

It is an object of the invention to increase the relative transmission for red of the glass of the window of the cathode ray tube relative to the transmission for blue, the transmission for green remaining unchanged. As a result it is possible to reduce the required voltage of the electron gun supplying the electrons for the red luminescent phosphors to a considerable extent.

It has been found that this purpose is achieved by introducing in the glass a modification of the weight ratio between NiO and CoO.

According to the invention glass for an envelope of a cathode ray tube for the display of television images, particularly display of coloured television images and containing NiO and CoO as coloured oxides, is characterized in that NiO and CoO are present in a weight ratio which is at least 10 and at most 30 while the condition $$0.4 < 97 C_{CoO} + 21 C_{NiO} < 0.5$$

is also satisfied, wherein $C_{CoO}$ and $C_{NiO}$ represent the contents of these oxides in percent by weight in the glass.

The last-mentioned condition means that the overall transmission of the glass for visible light relative to the known glass remains approximately the same. The two coefficients in the formula are the specific absorption coefficients for the overall amount of visible light for the two coloured oxides.

The invention will further be described with reference to the accompanying drawing, and a comparison of two glasses according to the invention with a known glass. The drawing is a graphic representation of the transmission D in percent as a function of the frequency (cm$^{-1}$) or of the wavelength (nm). Composition 1 is a known glass, the compositions 2 and 3 are glasses according to the invention. The drawing shows that the transmission for red (618 nm) of 2 and 3 relative to 1 is increased, the transmission for blue (455 nm) is decreased while the transmission for green (520 nm) has remained substantially unchanged.

According to the invention any glass suitable for the display of television images may be given an improved transmission characteristic in practice.

|  | Composition in % by weight | | |
|---|---|---|---|
|  | 1 | 2 | 3 |
| SiO$_2$ | 64 | 64 | 64 |
| Al$_2$O$_3$ | 3.4 | 3.4 | 3.4 |
| Na$_2$O | 9.0 | 9.0 | 9.0 |
| K$_2$O | 7.3 | 7.3 | 7.3 |
| CaO | 1.6 | 1.6 | 1.6 |
| BaO | 12.7 | 12.7 | 12.7 |
| MgO | 1.2 | 1.2 | 1.2 |
| CeO$_2$ | 0.2 | 0.2 | 0.2 |
| Sb$_2$O$_3$ | 0.6 | 0.6 | 0.6 |
| CoO | 0.0020 | 0.0013 | 0.0007 |
| NiO | 0.0137 | 0.0150 | 0.0170 |

The use of glasses 2 and 3 for windows of colour television display tubes has the result that the gun supplying the electrons for the red phosphor can be operated at a voltage which is approximately 10 percent lower than when using glass 1. Lifetests have shown that as a result the lifetime of the tubes is extended considerably.

What is claimed is:

1. In a glass of the type suitable for a window of a cathode ray tube for the display of colored television images, the improvement being that said glass consists essentially of cobalt and nickel, said glass having a relatively increased transmission at approximately 618 nm and a relatively decreased transmission at approximately 455 nm, said respective relative increase and decrease occurring as the weight ratio of NiO and CoO is increased from at least 10 to at most 30 and where the condition $$0.4 < 97 C_{CoO} + 21 C_{NiO} < 0.5$$

is satisfied, $C_{CoO}$ and $C_{NiO}$ representing the contents in percent by weight of the respective oxides CoO and NiO said weight ratio and condition being such that said glass exhibits a transmission at 618 nm greater than at 455 nm.

2. In a glass of the type suitable for a window of a cathode ray tube for the display of colored television images, the improvement being that said glass consists essentially of cobalt and nickel, said glass having a relatively increased transmission at approximately 618 nm and a relatively decreased transmission at approximately 455 nm, said respective relative increase and decrease occurring as the weight ratio of NiO and CoO is increased from at least 10 to at most 30 and where the condition $$0.4 < 97 C_{CoO} + 21 C_{NiO} < 0.5$$

is satisfied, $C_{CoO}$ and $C_{NiO}$ representing the contents in percent by weight of the respective oxides $C_{CoO}$ and $NiO$ and the glass has a composition in weight percent approximately as follows:

| | | | |
|---|---|---|---|
| $SiO_2$ | 64 | $CeO_2$ | 0.2 |
| $Al_2O_3$ | 3.4 | $Sb_2O_3$ | 0.6 |
| $Na_2O$ | 9.0 | CoO | 0.0013–0.0007 |
| $K_2O$ | 7.3 | NiO | 0.0150–0.0170 |
| CaO | 1.6 | | |
| BaO | 12.7 | | |
| MgO | 1.2 | | | said weight ratio and condition being such that said glass exhibits a transmission at 618 nm greater than at 455 nm.

* * * * *

UNITED STATES PATENT OFFICE
CERTIFICATE OF CORRECTION

Patent No. 3821004      Dated June 28, 1974

Inventor(s) COENRAAD MARIA LA GROUW

It is certified that error appears in the above-identified patent and that said Letters Patent are hereby corrected as shown below:

In the title page, in the abstract, line 3,

"(at approximately 618 mn)" should be

--(at approximately 618 nm)--

Claim 2, line 14, after "$C_{CoO}$" delete "41"

line 14, reprint "and" in regular print

Claim 2, line 1 of column 4,

"and the glass has a composition in weight percent approximately as follows:"

should be reprinted in regular print

Signed and sealed this 3rd day of December 1974.

(SEAL)
Attest:

McCOY M. GIBSON JR.
Attesting Officer

C. MARSHALL DANN
Commissioner of Patents